US012196007B2

(12) United States Patent
Weber et al.

(10) Patent No.: US 12,196,007 B2
(45) **Date of Patent: *Jan. 14, 2025**

(54) SELF-ALIGNING MODULAR LATCH

(71) Applicant: CareFusion 303, Inc., San Diego, CA (US)

(72) Inventors: Frank Dean Weber, San Diego, CA (US); Christoph Potakowskyj, Vienna (AT); Johannes Pollhammer, Purkersdorf (AT)

(73) Assignee: CareFusion 303, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,114

(22) Filed: Oct. 19, 2023

(65) Prior Publication Data

US 2024/0044177 A1 Feb. 8, 2024

Related U.S. Application Data

(63) Continuation of application No. 17/902,470, filed on Sep. 2, 2022, now Pat. No. 11,821,239, which is a (Continued)

(51) Int. Cl.
*E05B 65/46* (2017.01)
*E05B 15/02* (2006.01)
(Continued)

(52) U.S. Cl.
CPC ............ *E05B 65/46* (2013.01); *E05B 15/022* (2013.01); *E05B 47/0009* (2013.01); *E05C 3/24* (2013.01);
(Continued)

(58) Field of Classification Search
CPC .... E05B 65/46; E05B 15/022; E05B 47/0009; E05C 3/24; E05C 19/009; G07F 17/0092
See application file for complete search history.

(56) References Cited

U.S. PATENT DOCUMENTS

| | | | |
|---|---|---|---|
| 259,601 | A | 6/1882 | Swanson |
| 336,316 | A | 2/1886 | Hillery |

(Continued)

FOREIGN PATENT DOCUMENTS

| | | |
|---|---|---|
| BR | PI0800609 | 11/2008 |
| CN | 202295731 | 7/2012 |

(Continued)

OTHER PUBLICATIONS

Australian Examination Report No. 1 for Application No. 2012209330, dated Mar. 13, 2016, 3 pages.

(Continued)

*Primary Examiner* — Christine M Mills
*Assistant Examiner* — Faria F Ahmad
(74) *Attorney, Agent, or Firm* — Morgan, Lewis & Bockius LLP

(57) ABSTRACT

A container is disclosed that has a housing and a lid. The lid has a planar portion and a latch that is freely movable parallel to the planar portion of the lid. The latch has a retention feature and a first reference surface that is perpendicular to the planar portion of the lid. There is a latch mechanism coupled to the housing that has an engagement element configured to engage the retention feature of the latch and a first alignment feature having a first alignment surface. The first alignment feature is configured to laterally displace the latch in a first direction such that the first reference surface aligns with the first alignment surface when the lid is brought together with the housing with the fastener laterally displaced away from the engagement element in a second direction that is opposite to the first direction.

20 Claims, 7 Drawing Sheets

Related U.S. Application Data continuation of application No. 16/588,927, filed on Sep. 30, 2019, now Pat. No. 11,466,476, which is a continuation of application No. 14/973,416, filed on Dec. 17, 2015, now Pat. No. 10,435,918, which is a continuation of application No. 13/012,747, filed on Jan. 24, 2011, now Pat. No. 9,243,427.

(51) Int. Cl.

| | |
|---|---|
| ***E05B 47/00*** | (2006.01) |
| ***E05C 3/24*** | (2006.01) |
| ***E05C 19/00*** | (2006.01) |
| ***G07F 17/00*** | (2006.01) |
| *E05B 65/00* | (2006.01) |
| *E05B 65/08* | (2006.01) |
| *E05B 83/30* | (2014.01) |
| *E05B 83/32* | (2014.01) |
| *E05B 85/02* | (2014.01) |

(52) U.S. Cl.

CPC .......... *E05C 19/009* (2013.01); *E05B 65/006* (2013.01); *E05B 65/0811* (2013.01); *E05B 83/30* (2013.01); *E05B 83/32* (2013.01); *E05B 85/02* (2013.01); *G07F 17/0092* (2013.01); *Y10S 292/51* (2013.01); *Y10S 292/55* (2013.01); *Y10S 292/60* (2013.01); *Y10T 292/08* (2015.04); *Y10T 292/0908* (2015.04); *Y10T 292/0926* (2015.04); *Y10T 292/0928* (2015.04); *Y10T 292/0934* (2015.04); *Y10T 292/0951* (2015.04); *Y10T 292/096* (2015.04); *Y10T 292/0969* (2015.04); *Y10T 292/1014* (2015.04); *Y10T 292/1022* (2015.04); *Y10T 292/1043* (2015.04); *Y10T 292/1051* (2015.04); *Y10T 292/1052* (2015.04); *Y10T 292/1053* (2015.04); *Y10T 292/1061* (2015.04); *Y10T 292/1075* (2015.04); *Y10T 292/1078* (2015.04); *Y10T 292/1082* (2015.04); *Y10T 292/696* (2015.04); *Y10T 292/699* (2015.04); *Y10T 292/702* (2015.04)

(56) References Cited

U.S. PATENT DOCUMENTS 975,013 A 11/1910 Augenbraun
975,455 A 11/1910 Prevost
976,261 A 11/1910 Hodgkinson
1,023,391 A 4/1912 Parsons
1,144,537 A 6/1915 Gabriel
1,179,712 A 4/1916 Fournier
1,655,525 A 1/1928 Underwood
2,256,465 A 9/1941 Brubaker
2,764,874 A 10/1956 Sharpe
2,772,106 A 11/1956 Semelka
2,793,891 A 5/1957 Frye
2,869,952 A 1/1959 Saunders
2,956,827 A 10/1960 Humphries
3,086,830 A 4/1963 Malia
3,160,431 A 12/1964 Anderson
3,183,029 A * 5/1965 Gehrie ................ E05B 65/5238 24/683
3,439,948 A 4/1969 Smith
3,451,702 A 6/1969 Little
3,584,907 A 6/1971 Mertes
4,007,955 A 2/1977 Kobayashi
4,365,830 A 12/1982 Paulson
4,441,767 A 4/1984 Stark
4,447,005 A 5/1984 Kelly
4,453,743 A 6/1984 Sanders
4,835,997 A 6/1989 Akright
4,962,800 A 10/1990 Owiriwo
5,172,575 A 12/1992 Fisher
5,348,355 A 9/1994 Oyha
5,392,951 A 2/1995 Gardner
5,407,126 A 4/1995 Coultas
5,465,191 A 11/1995 Nomura
5,476,220 A 12/1995 Cohoon
5,855,423 A 1/1999 Cram
6,011,999 A 1/2000 Holmes
6,082,787 A 7/2000 Chioffi
6,099,051 A 8/2000 Murphy
6,108,196 A 8/2000 Jung
6,115,239 A 9/2000 Kim
6,125,040 A 9/2000 Nobuchi
6,290,270 B1 9/2001 Spiessl
6,327,879 B1 12/2001 Malsom
6,338,007 B1 1/2002 Broadfield
6,517,129 B1 2/2003 Chien
6,535,380 B1 3/2003 Lee
6,659,516 B2 12/2003 Wang
6,707,665 B2 3/2004 Hsu
6,871,519 B2 3/2005 Butera
6,965,512 B2 11/2005 Huang
7,040,504 B2 5/2006 Broadfield
7,201,409 B2 4/2007 Adachi
7,256,987 B2 8/2007 Weng
7,380,843 B2 6/2008 Alacqua
7,416,228 B2 8/2008 Pfitzinger
7,426,425 B2 9/2008 Meek, Jr.
7,490,874 B2 2/2009 Chen
7,495,901 B2 2/2009 Yun
7,549,684 B2 6/2009 Shi
7,585,006 B2 9/2009 Alacqua
7,625,019 B2 12/2009 Alacqua
7,665,774 B2 2/2010 Kumagai
7,740,289 B2 6/2010 Tang
7,743,935 B2 6/2010 Maid
7,775,070 B2 8/2010 Lim
7,784,886 B2 8/2010 Ashby
7,793,791 B1 9/2010 Pouille
7,810,852 B2 10/2010 Alacqua
7,815,228 B2 10/2010 Grunow
7,823,991 B2 11/2010 Purdy
7,841,632 B2 11/2010 Tracy
7,885,064 B2 2/2011 Chen
7,889,488 B2 2/2011 Kumagai
7,889,788 B2 2/2011 Toma et al.
7,894,748 B2 2/2011 Su
8,172,282 B2 5/2012 Lev
8,262,142 B2 9/2012 Ramsauer
8,272,169 B2 9/2012 Mahdi
8,274,788 B2 9/2012 Yang
8,328,246 B2 12/2012 Zhang
8,335,588 B2 12/2012 Rahilly
8,342,580 B2 1/2013 Cowie
8,360,485 B2 1/2013 Ma
8,376,478 B2 2/2013 Weber
8,385,063 B2 2/2013 Zhu
8,393,650 B2 3/2013 Eliot, Jr.
8,419,079 B2 4/2013 Cheng
8,457,784 B2 6/2013 Rahilly
8,576,562 B2 11/2013 Schwager
8,702,134 B2 4/2014 Lesjak
8,744,621 B2 6/2014 Michael
8,985,643 B2 3/2015 Fang
9,243,427 B2 1/2016 Weber
9,957,657 B2 5/2018 Dirnberger
10,806,322 B2 * 10/2020 Dirnberger .......... E05B 47/0603
2001/0013742 A1 8/2001 Lu
2002/0017793 A1 2/2002 Spiessl
2002/0089190 A1 7/2002 Wang
2002/0163206 A1 11/2002 Bass
2003/0127866 A1 7/2003 Martinez
2004/0104652 A1 6/2004 Holmes
2004/0140678 A1 7/2004 Linares
2005/0052033 A1 3/2005 Pfitzinger
2005/0073155 A1 4/2005 Weng
2005/0113970 A1 5/2005 Holmes
2005/0121918 A1 6/2005 Smock
2005/0160774 A1 7/2005 Weinstein et al.

(56) References Cited

U.S. PATENT DOCUMENTS

| | | | |
|---|---|---|---|
| 2005/0194795 | A1 | 9/2005 | Hapke |
| 2006/0012190 | A1 | 1/2006 | Alacqua |
| 2006/0087127 | A1 | 4/2006 | Schimmler |
| 2006/0087128 | A1 | 4/2006 | Salice |
| 2007/0108777 | A1 | 5/2007 | Mueller et al. |
| 2007/0120376 | A1 | 5/2007 | Bella |
| 2007/0222230 | A1 | 9/2007 | Plett |
| 2007/0228741 | A1 | 10/2007 | Park |
| 2008/0100066 | A1 | 5/2008 | Mueller |
| 2008/0142522 | A1 | 6/2008 | Maid |
| 2008/0238109 | A1 | 10/2008 | Huang |
| 2008/0238113 | A1 | 10/2008 | Ricchitelli et al. |
| 2008/0272606 | A1 | 11/2008 | Alacqua |
| 2009/0108591 | A1 | 4/2009 | De Vries |
| 2009/0204254 | A1 | 8/2009 | Weber |
| 2009/0223966 | A1 | 9/2009 | Kidd |
| 2010/0053857 | A1 | 3/2010 | Zhu |
| 2011/0309638 | A1 | 12/2011 | Gaj |
| 2012/0106065 | A1 | 5/2012 | Yu |
| 2012/0170182 | A1 | 7/2012 | Liu |
| 2012/0187128 | A1 | 7/2012 | Weber |
| 2012/0187815 | A1 | 7/2012 | Weber |
| 2012/0250230 | A1 | 10/2012 | Lin |
| 2012/0312594 | A1 | 12/2012 | Hapke |
| 2013/0020813 | A1 | 1/2013 | Storr |
| 2014/0009051 | A1 | 1/2014 | Liu |
| 2014/0053388 | A1 | 2/2014 | Mazzei |
| 2015/0238065 | A1 * | 8/2015 | Osvatic .................. E06B 5/006 49/394 |
| 2015/0247348 | A1 | 9/2015 | Krishnan |
| 2016/0138809 | A1 * | 5/2016 | Colucci ............... E05B 15/0046 292/122 |
| 2016/0186471 | A1 | 6/2016 | Cho |

FOREIGN PATENT DOCUMENTS

| | | |
|---|---|---|
| EP | 2065309 | 6/2009 |
| GB | 2096229 | 10/1982 |
| KR | 1020060073916 | 6/2006 |
| WO | WO-2010000244 | 1/2010 |

OTHER PUBLICATIONS

Brazilian Office Action for Application No. BR112013018517-1, dated Nov. 1, 2019, 5 pages.

Canadian Office Action for Application No. 2825205, dated Oct. 5, 2017, 4 pages.

Chinese First Office Action for Application No. 201110194855.9, dated Apr. 1, 2015, 11 pages.

Chinese Second Office Action for Application No. 201110194855.9, dated Dec. 3, 2015, 4 pages.

Extended European Search Report for Application No. 12739845.1, dated Sep. 21, 2016, 8 pages.

Indian Office Action for Application No. 5365/CHENP/2013, dated Feb. 7, 2019, 7 pages.

International Search Report and Written Opinion for Application No. PCT/US2012/022250, dated Sep. 3, 2012.

Office Action for United Arab Emirates Patent Application No. UAE/P/0777/2013, dated Jun. 22, 2017, 10 pages.

* cited by examiner

SELF-ALIGNING MODULAR LATCH

CROSS-REFERENCE TO RELATED APPLICATIONS

This application is a continuation of U.S. patent application Ser. No. 17/902,470, filed Sep. 2, 2022, which is a continuation of U.S. patent application Ser. No. 16/588,927, filed Sep. 30, 2019, now U.S. Pat. No. 11,466,476 issued Oct. 11, 2022, which is a continuation of U.S. patent application Ser. No. 14/973,416, filed on Dec. 17, 2015, now U.S. Pat. No. 10,435,918 issued Oct. 8, 2019, which is a continuation of U.S. patent application Ser. No. 13/012,747, filed on Jan. 24, 2011, now U.S. Pat. No. 9,243,427 issued Jan. 26, 2016, and entitled "SELF-ALIGNING MODULAR LATCH," the disclosures of which are incorporated herein by reference.

BACKGROUND

Field

The present disclosure generally relates to systems and methods of providing secure storage and, in particular, relates to mechanisms that guide latch elements into precise alignment to compensate for tolerances in components and clearances in the assembly.

Description of the Related Art

Hospitals have a need to provide secure storage for certain medications such as narcotics and controlled substances while still making the medications available to care givers. One method of accomplishing this is to use lidded containers where the lid can only be opened when the container is connected to a power source and processor that can send the appropriate digital commands. The lidded container is filled with a medication in the pharmacy and the lid closed. While the container is being transported to the local Automatic Dispensing Machine (ADM), the contents of the container are secure as the lid cannot be opened without breaking the container. The container is installed in the ADM which provides power and can send the commands to open the lid. The software of the ADM is set up to open the lid only after certain requirements are met, such as verification that the individual accessing the container is authorized to do so.

Secure lidded containers may incorporate lid-release actuators that use memory alloy wire to release the lid. One drawback of memory alloy wire actuators is that they have a limited stroke, and therefore require that the latching elements be precisely located with respect to each other to reliably engage and disengage. Achieving this precise relative alignment may require the use of tighter tolerances than normally used in plastic parts, increasing the cost of the parts. Another approach incorporates an adjustable feature into the container, which typically adds cost to the parts as well as requiring additional labor to make the adjustment during assembly. It would be advantageous to be able to precisely locate the mating elements of a memory alloy wire actuated latch while allowing the use of standard tolerances for the components.

SUMMARY

The disclosed container has a housing with a lid that has a planar portion and a fastener coupled to the lid. The fastener is freely movable parallel to the planar portion of the lid. The fastener includes a retention feature and a first reference surface perpendicular to the planar portion of the lid. A latch is coupled to the housing, and includes an engagement element that is configured to engage the retention feature; and a first alignment feature having a first alignment surface. The first alignment feature is configured to laterally displace the fastener in a first direction when the lid is brought together with the housing with the fastener laterally displaced away from the latch in a second direction that is opposite to the first direction, such that the first reference surface aligns with the first alignment surface.

In another aspect, a mechanism for securing a lid to a housing is disclosed. The mechanism includes a fastener that is configured to be slidably coupled to the lid. The fastener includes a retention feature and a first reference surface. The mechanism also includes a latch configured to be coupled to the housing. The latch includes an engagement element configured to engage the retention feature and a first alignment feature having a first alignment surface. The first alignment feature is configured to laterally displace the fastener in a first direction, when the lid is brought together with the housing with the fastener laterally displaced away from the latch in a second direction that is opposite to the first direction, such that the first reference surface aligns with the first alignment surface.

In another aspect, a method of closing and securing a lidded container is disclosed. The method includes the steps of bringing a lid having a planar portion and a fastener that is freely movable parallel to the planar portion of the lid together with a housing having a latch and a first alignment feature, and laterally displacing the fastener in a first direction, when the lid is brought together with the housing with the fastener laterally displaced away from the latch in a second direction that is opposite to the first direction, such that a first reference surface of the fastener, the first reference surface being perpendicular to the planar portion of the lid, is aligned with a first alignment surface of the first alignment feature, and engaging a retention feature of the fastener with an engagement element of the latch.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The following description discloses embodiments of a container having a self-aligning latch such that tolerances in the assembly of the lidded container are compensated for by lateral motion of the latch fastener with respect to the engagement mechanism. These features allow the use of wider tolerances in the fabrication and assembly of the parts of the lidded container while still enabling the use of a lid-release actuator having a limited stroke.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

The method and system disclosed herein are presented in terms of a container adapted to contain medications and to be inserted into a drawer in an ADM. It will be obvious to those of ordinary skill in the art that this same configuration and method can be utilized in a variety of applications. Nothing in this disclosure should be interpreted, unless specifically stated as such, to limit the application of any method or system disclosed herein to a medical environment or to the dispensing of medications.

Figure 1:
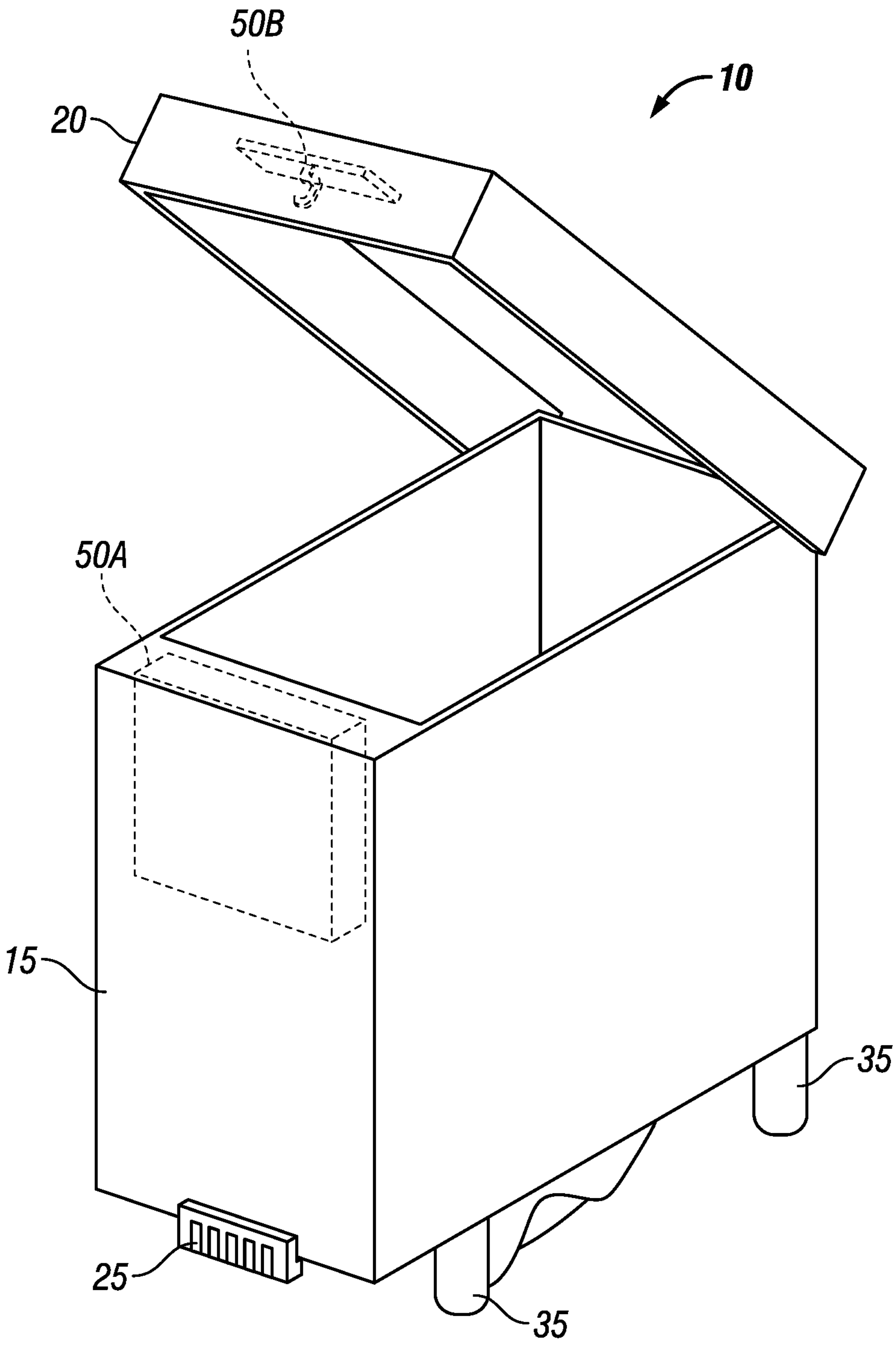
FIG. 1 is a perspective view of a container having a self-aligning latch according to certain aspects of this disclosure.

FIG. 1 is a perspective view of a container 10 according to certain aspects of this disclosure. The container 10 comprises a housing 15 and a lid 20 that is hingedly attached to body 15. The lid 20 is releasably retained in the closed position by a latching mechanism 50, which has a portion 50A is located in the housing 15 that engages the other portion 50B that is located in the lid 20 when the lid 20 is closed. In the illustrated embodiment, the housing 15 has four feet 35 on the bottom so that the container 10, which has various mechanical features (not shown) on the underside of the housing 15, will sit flat and stably on a horizontal surface. The container 10 is configured to be inserted into an ADM (not shown in FIG. 1) in which a connector 25 electrically mates with a matching connector that connects the latching mechanism to the controller of the ADM. The contents of container 10 are then available to caregivers who are authorized by the ADM and the hospital data system to open the container 10.

Figure 2:
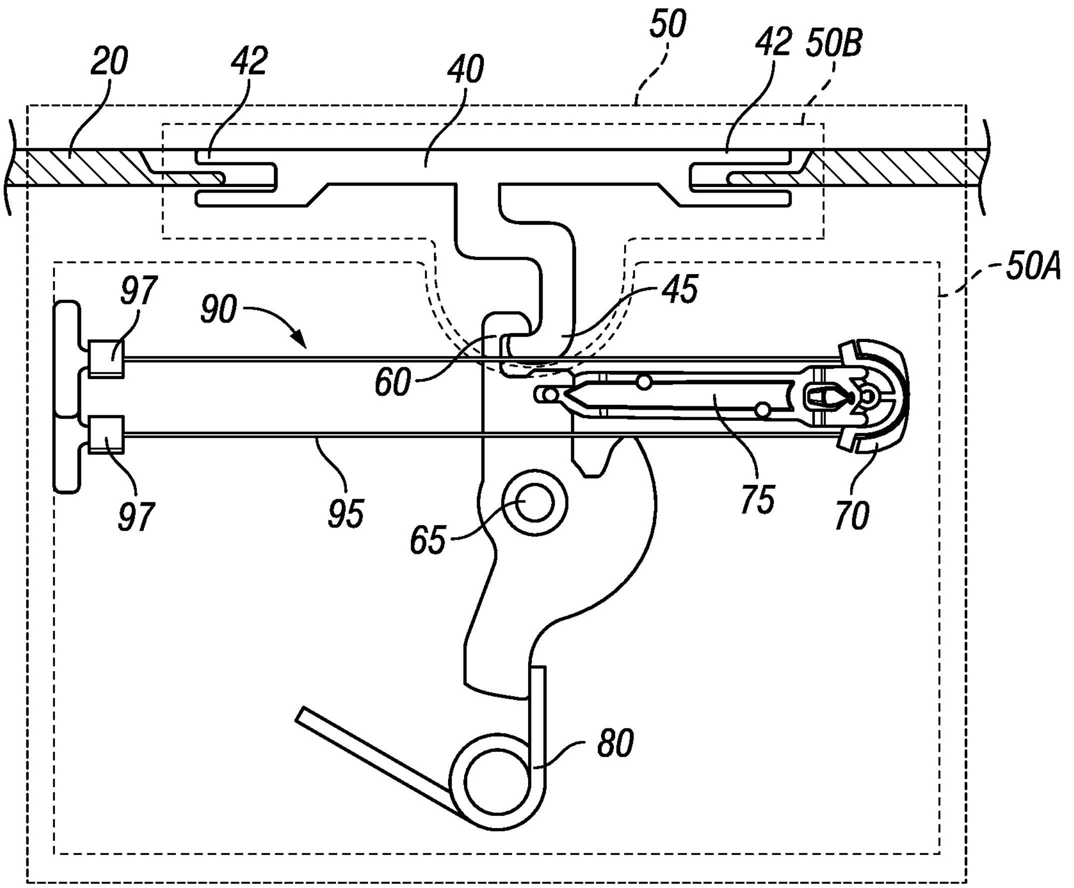
FIG. 2 depicts a latch release mechanism that includes a self-aligning latch according to certain aspects of this disclosure.

FIG. 2 depicts a latch release mechanism 50 that includes a self-aligning latch 40 according to certain aspects of this disclosure. The portions 50A and 50B from FIG. 1 are shown as dashed boxes around the components of the respective portions. In the view of FIG. 2, the plane of lid 20 is horizontal left-to-right and perpendicular to the page. The latch 40 has flanges 42 that are captured by the lid 20 with clearance such that latch 40 can move freely in the plane of the lid 20. The latch 40 has a retention feature 45 that is configured to be engaged by the engagement element 60, which is shown in the "closed" or "latched" position in FIG. 2. Engagement element 60, in this embodiment, pivots about pivot 65 that is fixedly attached to the housing 15 (not visible in FIG. 2). A biasing element 80, shown as a torsional spring in the embodiment of FIG. 2, applies a torque to engagement element 60 that urges engagement element 60 towards the "engaged" position shown in FIG. 2. A mechanical stop (not shown) prevents the engagement element 60 from rotating past this position.

The latch 40 is released by rotating the engagement element 60 counterclockwise, in the view of FIG. 2, sufficiently that the retention feature 45 and the latch 40 can move upwards without interference from the engagement element 60. This rotation of the engagement element 60 is caused by contraction of the actuator 90 that, in this embodiment, is a memory alloy wire actuator 90 that is actuated by passing current from one terminal 97 through the memory alloy wire 95 to the other terminal 97. The wire 95 contracts as its temperature rises, causing the actuator 90 to pull the rocker 70 to the left, in the view of FIG. 2, which then applies the force created by the actuator 90 to plunger 75 that transfers the applied force to the engagement element 60. The force from the actuator 90 offsets the force applied by the biasing element 80 and rotates the engagement element 60 counterclockwise.

Figure 3:
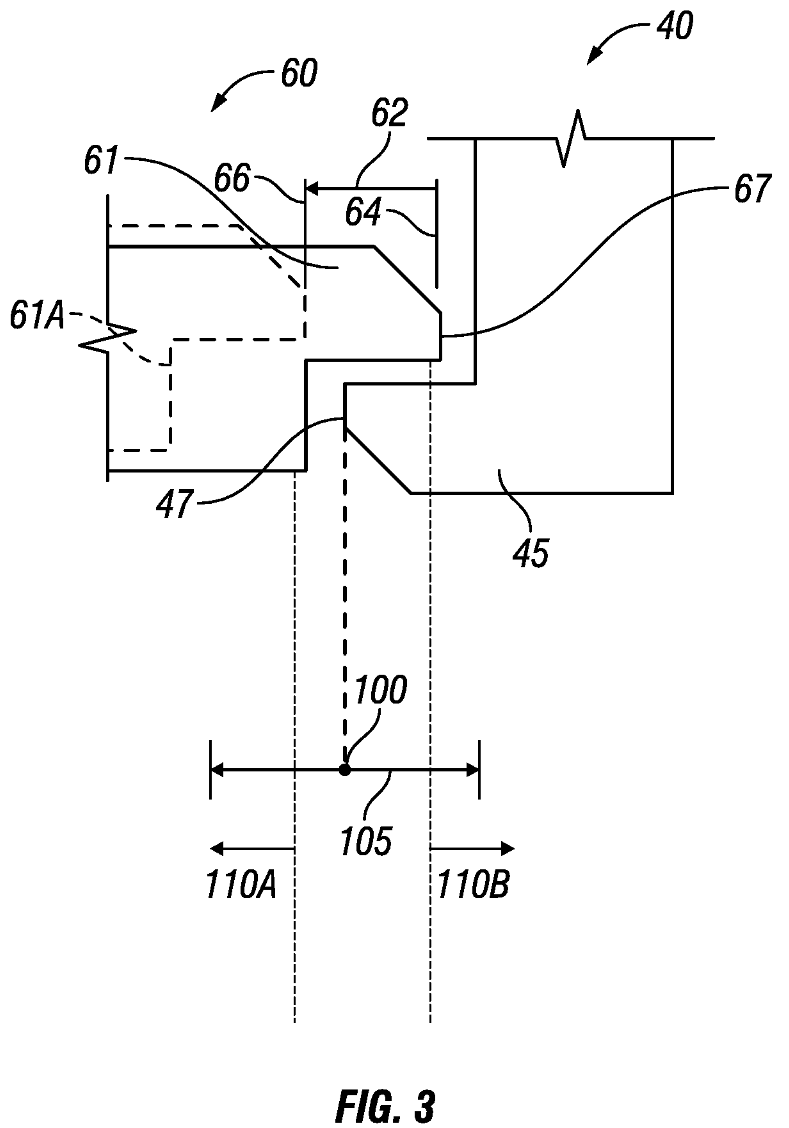
FIG. 3 is a diagram illustrating the effect of latch tolerances on the engagement of a latching mechanism according to certain aspects of this disclosure.

FIG. 3 is a diagram illustrating the effect of latch tolerances on the engagement of a latching mechanism according to certain aspects of this disclosure. The retention feature 45 of latch 40 and the tip 61 of engagement feature 60 are shown in their nominal relative positions. When acted upon by actuator 90 of FIG. 2, the tip 61 retracts from the nominal position to position 61A, shown by the dashed outline, with a travel distance indicated by arrow 62. The face 67 of tip 61 moves from position 64 to position 66.

Face 47 of retention feature 45 has a location tolerance indicated by the double-ended arrow 105 extending symmetrically, in this embodiment, from the position 100 that represents the nominal position of the face 47. This tolerance includes manufacturing tolerances of the latch 40, lid 20, housing 15, and other components as well as the amount of clearance between the assembled parts. In FIG. 3, the range of possible positions of face 47 is indicated by the vertical bars at each end of the arrow 105.

There are two possible interferences between the latch 40 and the engagement element 60 that would degrade the operation of the latching mechanism 50 of FIG. 2. First, if the retention element 95 (FIG. 2) is displaced to the left, the tip 61 cannot retract far enough so that face 67 moves to the left past face 47 of the latch 40, resulting in an inability to release the lid 20 of container 10. The zone of interference where the engagement element 60 cannot reliably release the latch 20 is shown as area 110A. The second interference occurs when the latch is displaced to the right sufficiently that face 47 of the latch 20 is to the right of face 67 of the engagement element 60 such that the retention feature 45 does not engage the tip 61 of the engagement element 60 and therefore the lid 20 cannot be secured in the closed position. The zone of interference where the engagement element 60 cannot reliably engage the latch 20 is shown as hatched area 110B.

Analysis of the tolerance stack of a system such as the latch mechanism 50 is a standard part of the design process. This analysis may be done as a simple sum of the maximum tolerance of each part and assembly, or it may be accomplished using a Root-Sum-Square (RSS) method wherein the individual tolerances are squared, then the squares are summed, and then the square root of the total computed. The RSS method is considered by some as a more useful prediction of tolerances as it treats each tolerance as having an independent statistical distribution and generally provides a more realistic total than a simple sum of maximum tolerances. The prevention of interference problems is complicated when a memory alloy wire actuator 90 is used, as the stroke 62 of a memory alloy wire device is small relative to many other types of actuators. It is often necessary to require tighter tolerances than normally used for part dimensions, increasing the cost of the parts, as well as possibly using an adjustable assembly, which is not only more expensive in part cost but incurs additional labor cost. The ability of the self-aligning latch of the instant application to achieve a tight tolerance relative position of the engagement feature 45 of latch 40 and tip 61 of the engagement element 60 enables the use of a memory alloy wire actuator 90 while allowing the parts to use standard tolerances that decrease cost and simplify the assembly with good functional consistency.

Figure 4A:
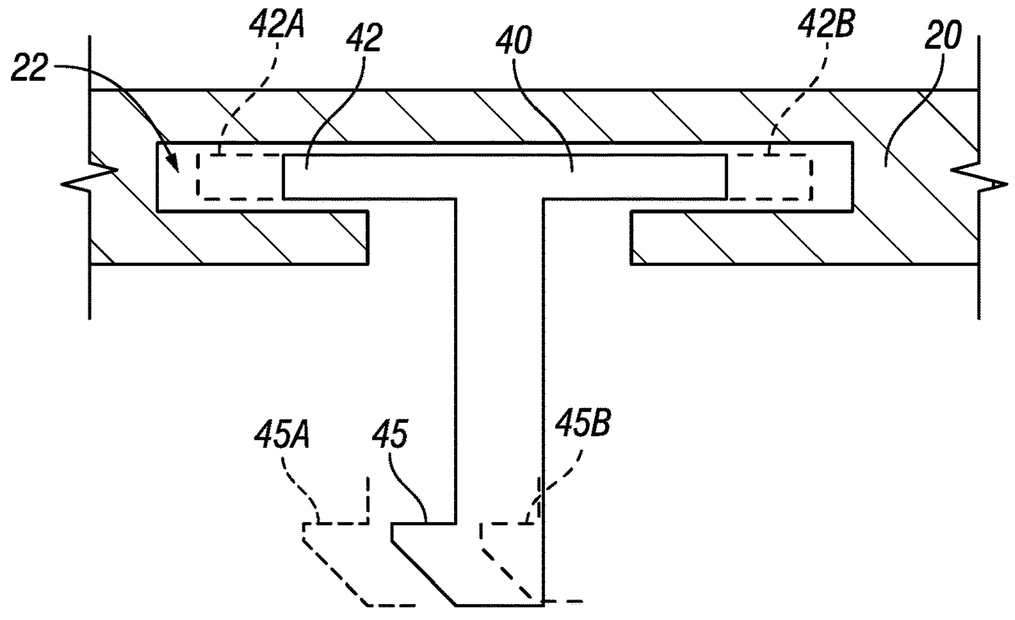
FIGS. 4A-4B are views of a self-aligning latch according to certain aspects of this disclosure.
Figure 4B:
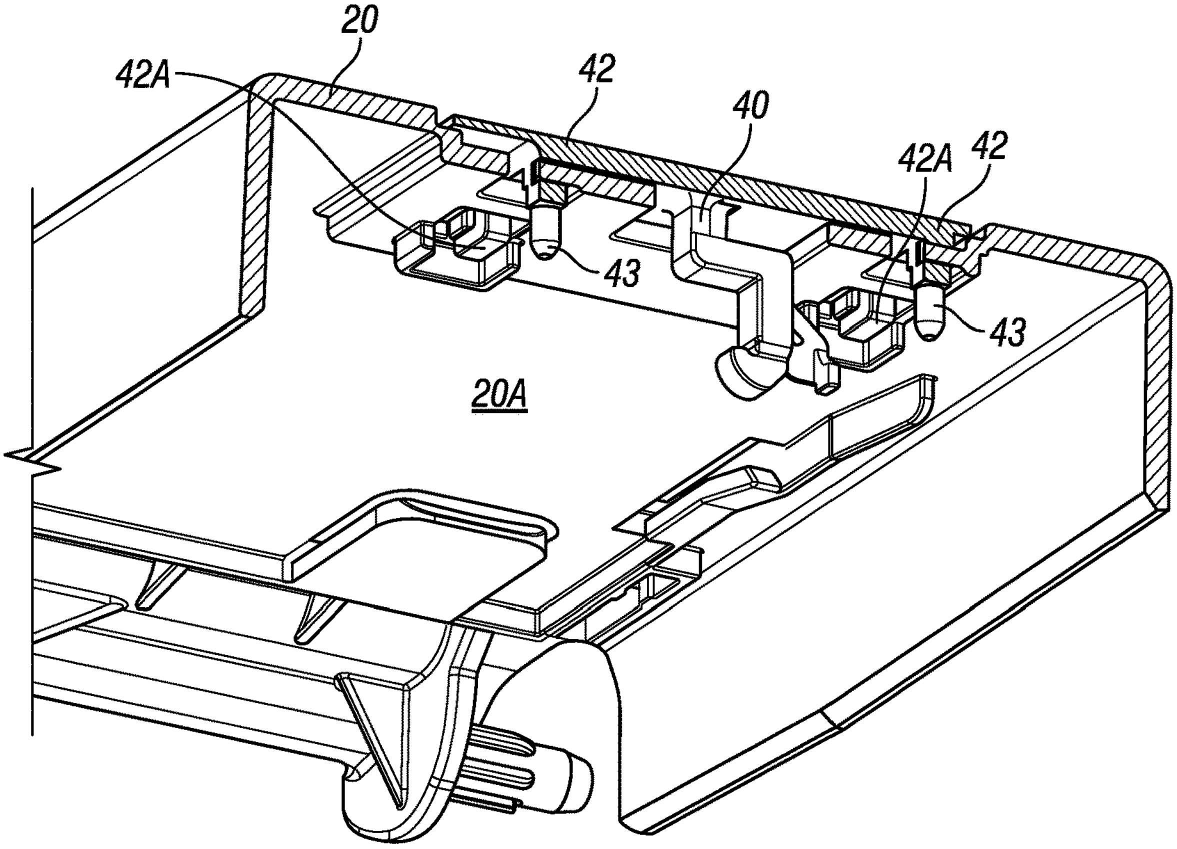

FIGS. 4A-4B are views of a self-aligning latch 40 according to certain aspects of this disclosure. FIG. 4A is a front cross-section view of a lid 20 and a captured floating latch 40. In this embodiment, the lid 20 has a slot 22 in which the flanges 42 of latch 40 fit with clearance. The latch 40 is movable from side to side, in this view, where dashed outlines 42A and 42B show the leftmost and rightmost possible positions of flanges 42. When latch 40 moves to positions 42A and 42B, the retention feature 45 moves to the positions indicated by dashed outlines 45A and 45B, respectively. Similarly, there is clearance for the latch to move fore and aft within the slot 22.

FIG. 4B is a perspective cut-away of the lid 20 from container 10 of FIG. 1. The floating latch 40 has flanges 42 that extend above a portion of lid 20. Tabs 42A are shown that pass through holes in the lid 20 and capture the flanges 42 against lid 20. These tabs allow latch motion both left-right and fore-aft. Other methods of retaining latch 40 to lid 20 while allowing lateral motion parallel to the planar portion 20A of lid 20 in only the left-right direction, only the fore-aft direction, or in both directions simultaneously will be apparent to those of ordinary skill in the art.

In the embodiment shown in FIG. 4B, guide pins 43 are provided as part of the floating latch 40 to provide initial centering to minimize the amount of centering required by the other features. The guide pins 43 are aligned by pocket holes in the body (not shown in FIG. 4B) wherein there is adequate clearance between the guide pins 43 and the pocket holes so that the final alignment is accomplished as described in relation to FIGS. 5A-5C and 6A-6B. In some embodiments the guide pin interface with the mating pocket holes provide adequate centering in the fore-aft direction so as to eliminate any need for additional features to provide fore-aft centering, such as are shown in FIGS. 6A and 6B.

Figure 5A:
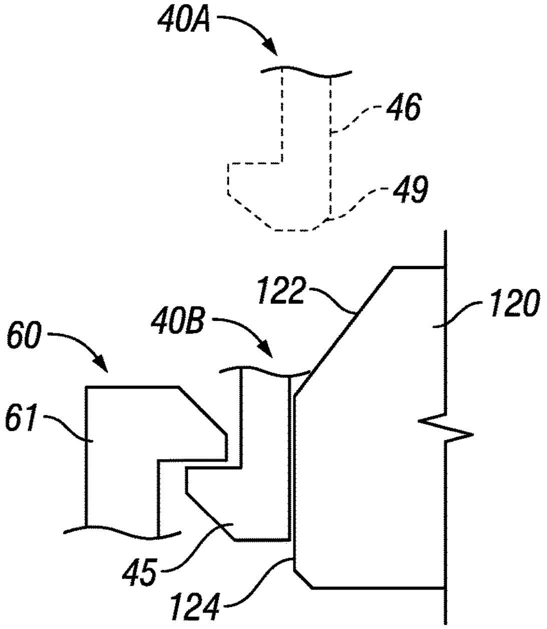
FIGS. 5A-5C are diagrams showing the function of a self-aligning latch according to certain aspects of this disclosure.
Figure 5B:
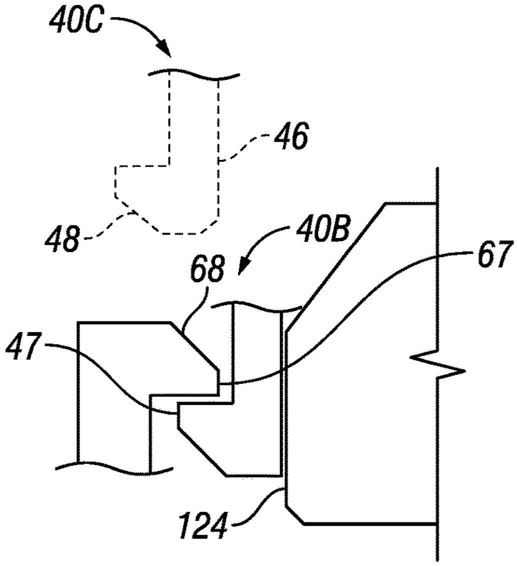
Figure 5C:
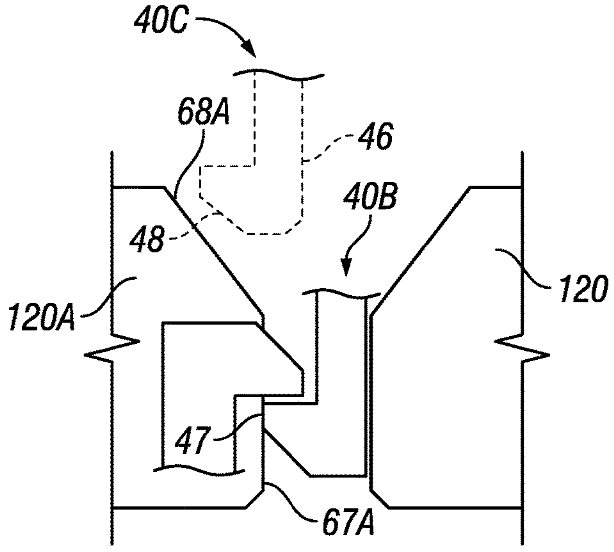
Figure 6A:
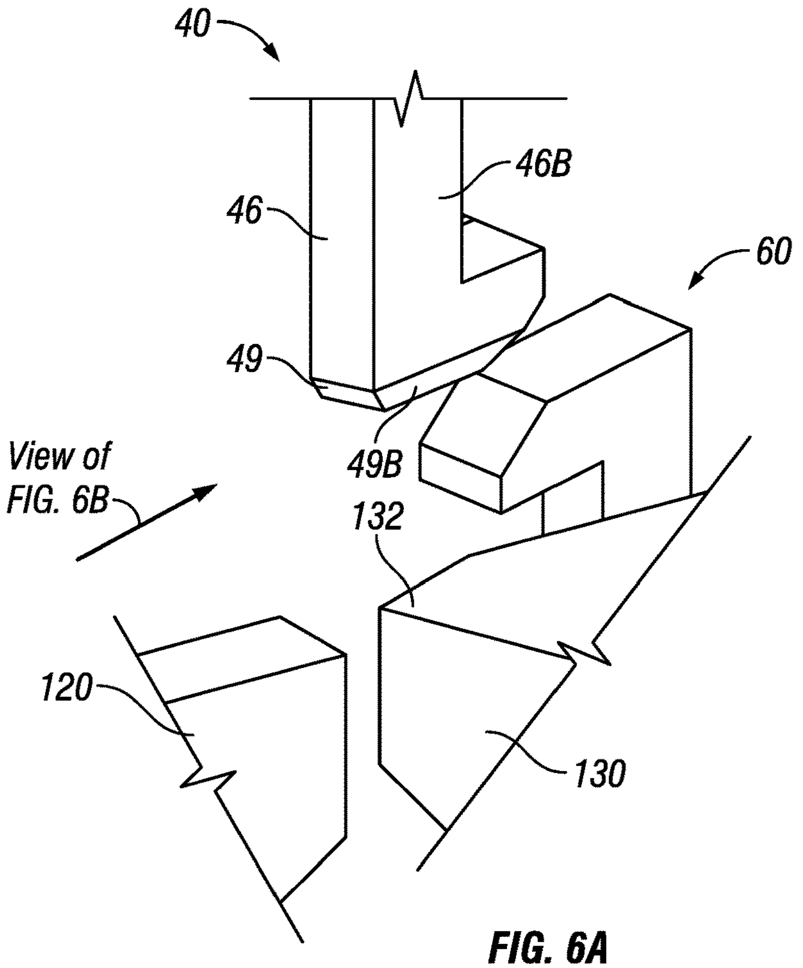
FIGS. 6A-6B illustrate the front-to-back alignment of a self-aligning latch according to certain aspects of this disclosure.
Figure 6B:
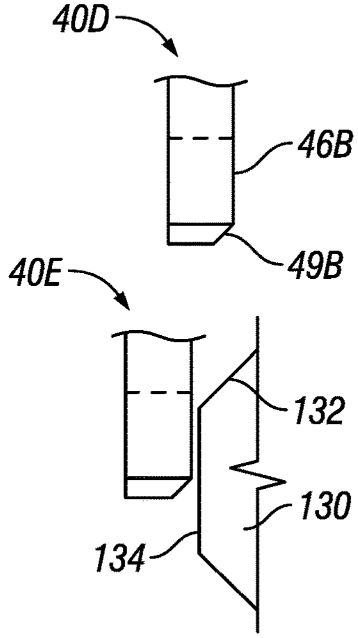

FIGS. 5A-5C are diagrams showing the function of a self-aligning latch 50 according to certain aspects of this disclosure. FIG. 5A shows the function when the latch 40 is in a position 40A that is to the right, in this view, of the nominal position, such that the retention feature 45 would not engage the tip 61 of the engagement element 60. As the latch 40 descends, surface 49 of the latch 40 contacts surface 122 of the alignment feature 120 fixedly attached to the housing 15. To descend further, latch 40 moves laterally to the left as surface 49 slides along surface 122. This lateral movement of the latch 40 is permitted by the arrangement depicted in FIGS. 4A and 4B. When the latch 40 reaches the end of surface 122, reference surface 46 of the latch 40 is aligned with alignment surface 124 of the alignment feature 120. Latch 40 then descends vertically with reference surface 46 sliding along alignment surface 124 and reaches position 40B. With surfaces 46 and 124 in contact, the retention feature 45 is properly positioned to both engage and disengage tip 61. The engaging surfaces 48 and 49 of the latch need not be angled if the mating guide surfaces 122 and 68 are angled. In this case the engaging surface of the latch may be a sharp corner or a radius.

FIG. 5B shows the function of the self-aligning latch 50 when latch 40 is positioned to the left of the nominal position, shown as position 40C, such that the retention feature 45 would not release from the tip 61 of the engagement element 60. As the latch 40 descends, surface 48 of the latch 40 contacts surface 68 of the tip 61. The torque applied by biasing element 80 of FIG. 2 is sufficient that latch 40 is displaced to the right before engagement element 60 is forced to rotate counterclockwise. Therefore to descend further, latch 40 moves laterally to the right as surface 48 slides along surface 68. This lateral motion continues until reference surface 46 contacts alignment surface 124, stopping further rightward lateral motion of latch 40. Latch 40 then continues to descend vertically with surfaces 46 and 124 now in contact, forcing engagement element 60 to rotate counterclockwise until the face 47 of retention feature 45 can pass by the face 67 of tip 61. Once the retention element 45 passes tip 61 and reaches position 40B, engagement element 60 rotates clockwise back to the "closed" position thereby retaining latch 40.

FIG. 5C shows the function of another embodiment of the self-aligning latch 50. As in FIG. 5B, latch 40 is positioned to the left of the nominal position, shown as position 40C, such that the retention feature 45 would not release from the tip 61 of the engagement element 60. In the embodiment of FIG. 5C, latch release mechanism portion 50A comprises a second alignment feature 120A, fixedly attached to the housing 15, that provides an alignment surface 68A and face 67A that function similar to the surface 68 and face 67 of FIG. 5B. As the latch 40 descends, surface 48 of the latch 40 contacts surface 68A of the second alignment feature 120A. Latch 40 is displaced laterally to the right as surface 48 slides along surface 68A until the face 47 of retention feature 45 is aligned with the face 67A of the second alignment feature 120A. Engagement element 60 is rotated counterclockwise as latch 40 descends and once the retention element 45 passes tip 61 and reaches position 40B, engagement element 60 rotates clockwise back to the "closed" position thereby retaining latch 40. In certain embodiments, the latch 40 comprises additional surfaces that interact with alignment features of the body, such as alignment elements 120 and 120A, and/or the engagement element 60 to accomplish the same lateral repositioning as the latch 40 descends.

FIGS. 6A-6B illustrate the front-to-back alignment features of a self-aligning latch 40 according to certain aspects of this disclosure. FIG. 6A is a perspective view of the latch 40, engagement element 60, the alignment element 120 from FIGS. 5A and 5B, and a third alignment element 130 that functions in a plane perpendicular to that of the first and second alignment elements 120 and 120A. The first reference surface 46 and the surface 49 of latch 40 and alignment feature 120 are repeated to provide a reference relative to FIGS. 5A and 5B. Latch 40 also has a second reference surface 46B that is perpendicular to both the planar portion 20A of lid 20 and to the first reference surface 46. Latch 40 also has a second surface 49B positioned adjacent to the first angled surface 49. The third alignment feature 130 has an angled surface 132 analogous to the angled surface 122 of alignment feature 120. The surface 49B may be angled or not provided the engaging surface 132 is angled. There can be a similar alignment element 140 on the opposite side of the latch for aligning the latch in the opposite direction (not shown in FIG. 6A).

FIG. 6B is a side view of the configuration of FIG. 6A, viewed as indicated by the arrow in FIG. 6A. Alignment feature 120 has been removed for clarity. FIG. 6B depicts the function of the latching mechanism 50 when the latch 40 is displaced to the rear, shown as position 40D, or to the front, shown as position 40F. As the latch 40 descends from position 40D, surface 49B of the latch 40 contacts surface 132 of the third alignment feature 130. To descend further, latch 40 moves forward (to the left in the orientation of FIG. 6B) as surface 49B slides along surface 132. When the latch 40 reaches the end of surface 132, reference surface 46B of the latch 40 is aligned with alignment surface 134 of the third alignment feature 130. Latch 40 then descends vertically with reference surface 46B sliding along alignment surface 134 and reaches position 40E. With surfaces 46B and 134 in contact, the retention feature 45 (not shown in FIG. 6B) is properly positioned to engage tip 61 (not shown in FIG. 6B). If the latch 40 is displaced too far forward, indicated as position 40F, latch 40 will contact surface 142 of the fourth alignment feature 140 as the latch 40 descends and be displaced toward the rear (to the right in the orientation of FIG. 6B) until it reaches position 40E. Hence, the latch 40, according to certain embodiments, is self-aligning along multiple axes.

Figure 7:
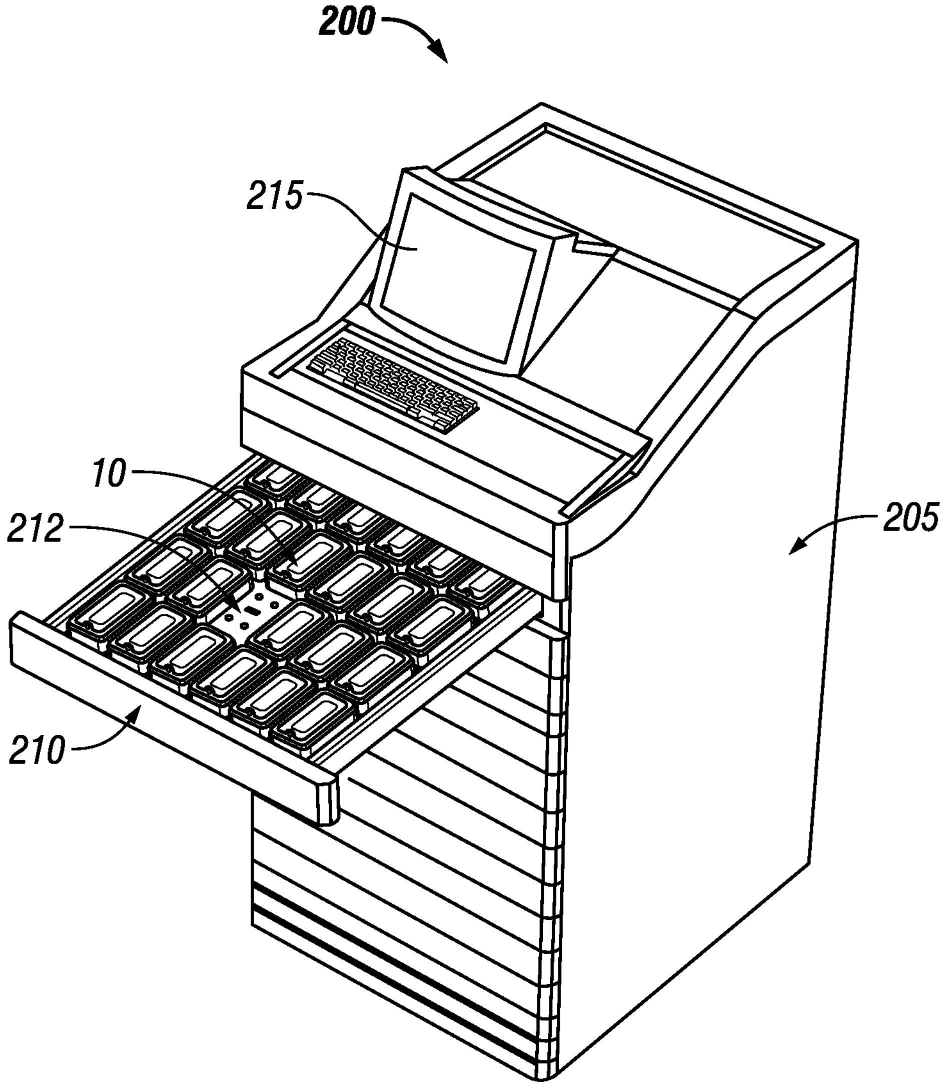
FIG. 7 illustrates an exemplary ADM that includes containers having self-aligning latches according to certain aspects of this disclosure.

FIG. 7 illustrates an exemplary ADM 200 that includes containers 10 having self-aligning latches according to certain aspects of this disclosure. The ADM 200 includes a cabinet 205 with a controller 215 that is, in this example, housed in the top structure of the ADM 200. The controller 215 includes a processor with a memory (not shown), a display, a keyboard and touchscreen input devices, a power supply (not shown), and communication modules (not shown) that couple the processor to the internal components of the ADM 200 and to external networks and systems. In certain embodiments, the ADM 200 includes a barcode scanner (not shown) that is fixedly or removably mounted to the top structure or cabinet 205. The ADM 200 also includes a drawer 210 that has multiple locations 212 configured to accept a container 10. In certain embodiments, the cabinet 205 is a smaller structure having only a few drawers 210, wherein the storage capacity of the ADM 200 is suitable for a single patient rather than a plurality of patients. In certain embodiments, the cabinet 205 is mounted to and supported by a wall.

In summary, the disclosed self-aligning latch mechanism compensates for accumulated tolerances in the parts and assembly of a lidded container and positions the latch of the lid in the proper position to engage and disengage an engagement element having a limited stroke from the closed position to the open position. The lid incorporates a latch that can move laterally with respect to the lid. The self-aligning latching mechanism incorporates reference surfaces on the latch and alignment features that laterally displace the latch to the proper position relative to the engagement element as the lid closes.

The previous description is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," "with" or the like is used in the description or the claims, such term is intended to be inclusive in a manner similar to the term "comprise" as "comprise" is interpreted when employed as a transitional word in a claim.

What is claimed is:

1. A mechanism for securing a lid to a housing, the mechanism comprising:

a latch being moveable relative to the lid, the latch extending from the lid and comprising a retention feature having a first reference surface; and a latch mechanism portion coupled to the housing, the latch mechanism portion comprising:

an engagement element, freely movable between a first position and a second position, configured to engage the retention feature in the first position to restrict vertical movement of the lid, and disengage from the retention feature in the second position to permit vertical movement of the lid;

a first alignment feature having a first alignment surface, the first alignment feature configured to displace the latch such that the first reference surface aligns with the first alignment surface;

a second alignment feature configured to displace the latch in a second lateral direction; and a third alignment feature, the third alignment feature configured to displace the latch in a third direction, when the lid is moved toward the housing.

2. The mechanism of claim 1, wherein the first alignment feature is configured to displace the latch when the lid is moved toward the housing such that the first reference surface aligns with the first alignment surface.

3. The mechanism of claim 1, wherein the first alignment feature configured to initially displace the latch in a first lateral direction away from the engagement element and then in a second lateral direction that is opposite to the first lateral direction towards the engagement element, such that the first reference surface aligns with the first alignment surface.

4. The mechanism of claim 3, wherein the first alignment feature is configured to initially displace the latch in the first lateral direction when the lid is moved toward the housing and before the latch contacts the first alignment feature.

5. The mechanism of claim 3, wherein the first alignment feature is configured to displace the latch in the second lateral direction when the lid is moved toward the housing and after the latch contacts the first alignment feature.

6. The mechanism of claim 3, wherein the retention feature engages and displaces the engagement element in the second lateral direction toward the second position as the retention feature passes between the first alignment feature and the engagement element.

7. The mechanism of claim 3, wherein the third alignment feature has a second alignment surface.

8. The mechanism of claim 7, wherein the third alignment feature configured to displace the latch in the third direction being perpendicular to the second lateral direction, when the lid is moved toward the housing with the latch displaced in a fourth direction away from the engagement element that is opposite to the third direction, such that the second reference surface aligns with the second alignment surface.

9. The mechanism of claim 8, wherein the third alignment feature is formed as a portion of the housing.

10. The mechanism of claim 8, wherein the latch mechanism portion comprises a fourth alignment feature configured to displace the latch in the fourth direction when the lid is moved toward the housing with the latch displaced in the third direction.

11. The mechanism of claim 1, wherein the first alignment feature is formed as a portion of the housing.

12. The mechanism of claim 1, wherein the second alignment feature is formed as a portion of the housing.

13. The mechanism of claim 1, wherein the latch comprises a second reference surface perpendicular to the first reference surface.

14. The mechanism of claim 1, wherein the housing is configured to contain medications and to be inserted into a drawer of an automated dispensing machine.

15. A method comprising:

moving a lid comprising a first latch mechanism portion comprising a latch extending from the lid and being moveable relative to the lid, toward a housing, the latch comprising a retention feature having a first reference surface, and the housing comprising a second latch mechanism portion comprising a first alignment feature and an engagement element freely movable between a first position and a second position;

engaging the latch against the first alignment feature and a second alignment feature to laterally displace the latch such that the first reference surface aligns with a first alignment surface of the first alignment feature;

displacing the latch via a third alignment feature in a third direction when the lid is moved toward the housing when the lid is brought together with the housing with the latch displaced in a fourth direction away from the engagement element that is opposite to the third direction; and directing the engagement element to the first position such that the engagement element interlocks with the retention feature to restrict vertical movement of the lid.

16. The method of claim 15, further comprising engaging the latch against the first alignment feature and the second alignment feature when the lid is moved toward the housing.

17. The method of claim 15, wherein engaging the latch against the first alignment feature and the second alignment feature further comprises initially displacing the latch in a first lateral direction via the first alignment feature away from the engagement element.

18. The method of claim 17, further comprising initially displacing the latch in the first lateral direction when the lid is moved toward the housing and before the latch contacts the first alignment feature.

19. The method of claim 17, wherein engaging the latch against the first alignment feature and the second alignment feature further comprises displacing the latch in a second lateral direction that is opposite the first lateral direction toward the engagement element after displacing the latch in the first lateral direction.

20. The method of claim 19, further comprising displacing the latch in the second lateral direction when the lid is moved toward the housing and after the latch contacts the first alignment surface.

* * * * *